United States Patent
Erickson et al.

(10) Patent No.: US 6,618,271 B1
(45) Date of Patent: Sep. 9, 2003

(54) EMI SHIELD

(75) Inventors: Vernon D. Erickson, Dakota Dunes, SD (US); David R. Davis, Jefferson, SD (US); Cesar D. Castillo, El Paso, TX (US); Richard A. Gibson, El Paso, TX (US); Armando Rocha, Canutillo, TX (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 10/113,086

(22) Filed: Apr. 1, 2002

(51) Int. Cl.[7] ................................................ H05K 9/00
(52) U.S. Cl. ...................... 361/818; 361/752; 361/753; 361/800; 361/816; 174/35 R
(58) Field of Search ................................ 361/752, 753, 361/800, 816, 818, 825, 728, 796, 727; 174/35 GC, 35 R

(56) References Cited

U.S. PATENT DOCUMENTS

| | | | |
|---|---|---|---|
| 5,204,496 A | 4/1993 | Boulay et al. ................ 174/35 |
| 5,317,105 A | 5/1994 | Weber .......................... 174/35 |
| 5,650,922 A | 7/1997 | Ho ............................... 361/799 |
| 5,796,594 A | 8/1998 | Kabat et al. ................. 361/818 |
| 5,856,632 A | * 1/1999 | Bostrom et al. ....... 174/35 GC |
| 5,957,465 A | 9/1999 | Gonsalves et al. .......... 277/637 |
| 6,058,025 A | 5/2000 | Ecker et al. ................. 361/816 |
| 6,080,930 A | 6/2000 | Lommen et al. .............. 174/35 |
| 6,219,239 B1 | 4/2001 | Mellberg et al. ............ 361/704 |
| 6,403,879 B1 | * 6/2002 | Clements et al. ...... 174/35 GC |

* cited by examiner

Primary Examiner—David Martin
Assistant Examiner—Thanh Yen Tran
(74) Attorney, Agent, or Firm—Scott Charles Richardson; Kevin E. West; Suiter - West

(57) ABSTRACT

An EMI shield for ports providing access to expansion cards received in the chassis of an electronic device comprises a gasket suitable for being disposed between the chassis and the expansion card bracket. The gasket includes an aperture overlying each of the ports and a plurality of generally flattened U shape fingers formed in the gasket adjacent to each aperture for engaging the bracket to provide EMI grounding between the bracket and the chassis.

68 Claims, 4 Drawing Sheets

EMI SHIELD

FIELD OF THE INVENTION

The present invention generally relates to the field of electronic devices, particularly computer systems, network servers, and the like having an expansion bay employing expansion cards, and particularly to an EMI shield for ports providing access to expansion cards within such electronic devices.

BACKGROUND OF THE INVENTION

Electronic devices, particularly, computer systems, network servers, photocopiers, facsimile machines, printers, control equipment, medical equipment, telecommunication equipment, and the like often employ expansion or interface cards providing expansion of functions for the electronic device or extending the ability of the device to communicate with and/or control peripheral devices, networks or the like. Such expansion cards typically comprise generally rectangular printed circuit boards having an edge connector formed along one side edge. The edge connector is inserted into an expansion slot disposed on a system board (often referred to in the art as a motherboard) mounted within the electronic device to couple the installed expansion card to other electronic components in the device. In typical configurations, the expansion slots are oriented so the expansion cards installed therein are arranged in a spaced apart, generally parallel array wherein end edges of the cards are aligned with each other.

Extending along the aligned end edges of the expansion cards are metal mounting brackets having outwardly bent tabs positioned adjacent to the side edges of the cards opposite the edge connector. When the expansion cards are installed within the chassis of the electronic device and seated in the expansion slot, these tabs rest against a ledge surface formed inside the chassis. Ports are formed within the chassis to provide access to expansion cards received therein via connectors, controls and the like disposed on the mounting brackets.

Because these ports form an opening in the chassis of the electronic device, shielding must be provided to prevent Electromagnetic Interference (EMI). Such shielding typically comprises one or more stamped metal gaskets attached to the chassis of the electronic device around each port. Fingers are formed in the gasket adjacent to the port openings to improve electrical contact between the mounting bracket of the expansion card and the housing for shielding the electronic device from EMI.

In the past, the use EMI shielding employing stamped metal gaskets has been problematic. For instance, where multiple cards are installed in an expansion bay, the pressure exerted by the installation of a first card often causes the gasket to flex or bend making later installation of cards in adjacent ports more difficult. Moreover, fingers formed in the gaskets typically comprised a small tab that is detached from the gasket at one end. These fingers may bind against the expansion card bracket as the expansion card is inserted, preventing the card from being properly seated. Further, because of their shape, fingers employed by conventional gaskets provide poor grounding between the expansion card bracket and the housing of the electronic device, and are thus not effective at reducing EMI.

Consequently, it would be desirable to provide an improved EMI shield which does not flex allowing two or more expansion cards to be inserted within adjacent expansion slots with uniform pressure, and which includes fingers that do not cause the expansion card bracket to bind as the expansion card is inserted within an expansion slot. The EMI shield should provide good EMI grounding between the brackets of expansion cards inserted in expansion slots (or alternately, between expansion port covers where no expansion card is used) and the chassis of the electronic device.

SUMMARY OF THE INVENTION

Accordingly, the present invention is directed to an EMI shield for ports providing access to expansion cards received in the chassis of an electronic device. In an exemplary embodiment, the EMI shield comprises a gasket suitable for being disposed between the chassis of the electronic device and the expansion card bracket. The gasket includes an aperture overlying each of the ports and a plurality of generally flattened U shape fingers formed in the gasket adjacent to each aperture for engaging the bracket to provide EMI grounding between the bracket and the chassis.

Preferably, the gasket is shaped so that flexing of the EMI shield is limited, allowing two or more expansion cards to be inserted within adjacent expansion slots with uniform pressure. Moreover, the fingers reduce binding between the expansion card bracket and the gasket as the expansion card is inserted within an expansion slot. The fingers also allow the EMI shield to provide good EMI grounding between the brackets of expansion cards inserted in expansion slots (or, alternately, between expansion port covers where no expansion card is used) and the chassis of the electronic device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
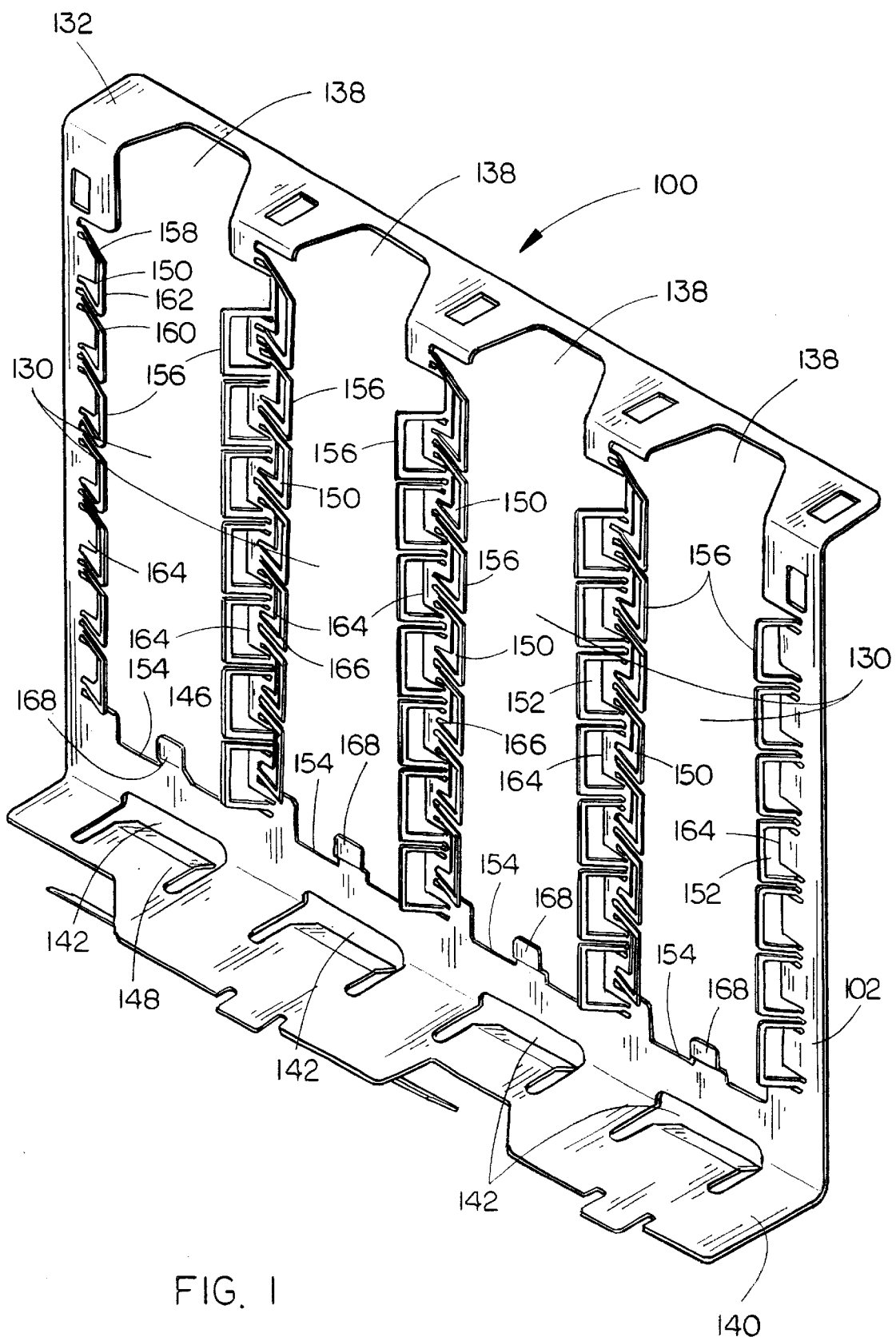
FIG. 1 is an isometric view illustrating an EMI shield in accordance with an exemplary embodiment of the present invention.

Reference will now be made in detail to the presently preferred embodiments of the invention, examples of which are illustrated in the accompanying drawings.

Referring generally now to FIGS. 1 through 4, an EMI shield in accordance with an exemplary embodiment of the present invention is described. The EMI shield 100 is comprised of a gasket 102 suitable for being disposed between the chassis 104 of an electronic device 106 and the mounting brackets 108 of expansion cards 110 received in the chassis 104. In exemplary embodiments of the invention, gasket 102 is formed of stainless steel via a stamping process. However, those of skill in the art will appreciate that gasket 102 may be formed of other materials and may be manufactured using other manufacturing processes without departing from the scope and spirit of the invention.

In exemplary embodiments, chassis 104 may include an internal expansion card receiving assembly or region 112 providing a plurality of expansion slots 114 each capable of accommodating an expansion card 110 for providing functions or resources to the electronic device 106 and/or for extending the ability of the device 106 to communicate with or control peripheral devices coupled thereto (not shown). Each expansion slot 114 is defined by a connector or socket 118 mounted to a printed circuit board 120 disposed within the chassis 104. When an expansion card 110 is received in an expansion slot 114, the edge connector 122 of the card is seated within the socket 118 of that slot 114 thereby coupling the expansion card 110 to the printed circuit board 120.

In exemplary embodiments, printed circuit board 120 may comprise a main system board, motherboard, or the like, which contains other electronic components of the electronic device 106 such as a processor, main memory, bus controller, keyboard controller, video controller, and the like. Alternately, the printed circuit board 120 may comprise a secondary board or daughterboard mounted within the card receiving assembly 112 and coupled to a main printed circuit board (e.g., a motherboard). Further, in exemplary embodiments of the invention, expansion slots 114 may comprise sockets 118 suitable for mating with edge connectors 122 having various pin configurations. In such embodiments, the number of pins, and the width and depth of the pins supported by sockets 118 is determined by the interface standard utilized by the computer system bus, e.g., Industry Standard Architecture (ISA), extended industry standard architecture (EISA), Peripheral Component Interconnect (PCI), Micro Channel Architecture (MCA), Video Electronics Standards Association Local Bus (VL-BUS), or the like.

Figure 2:
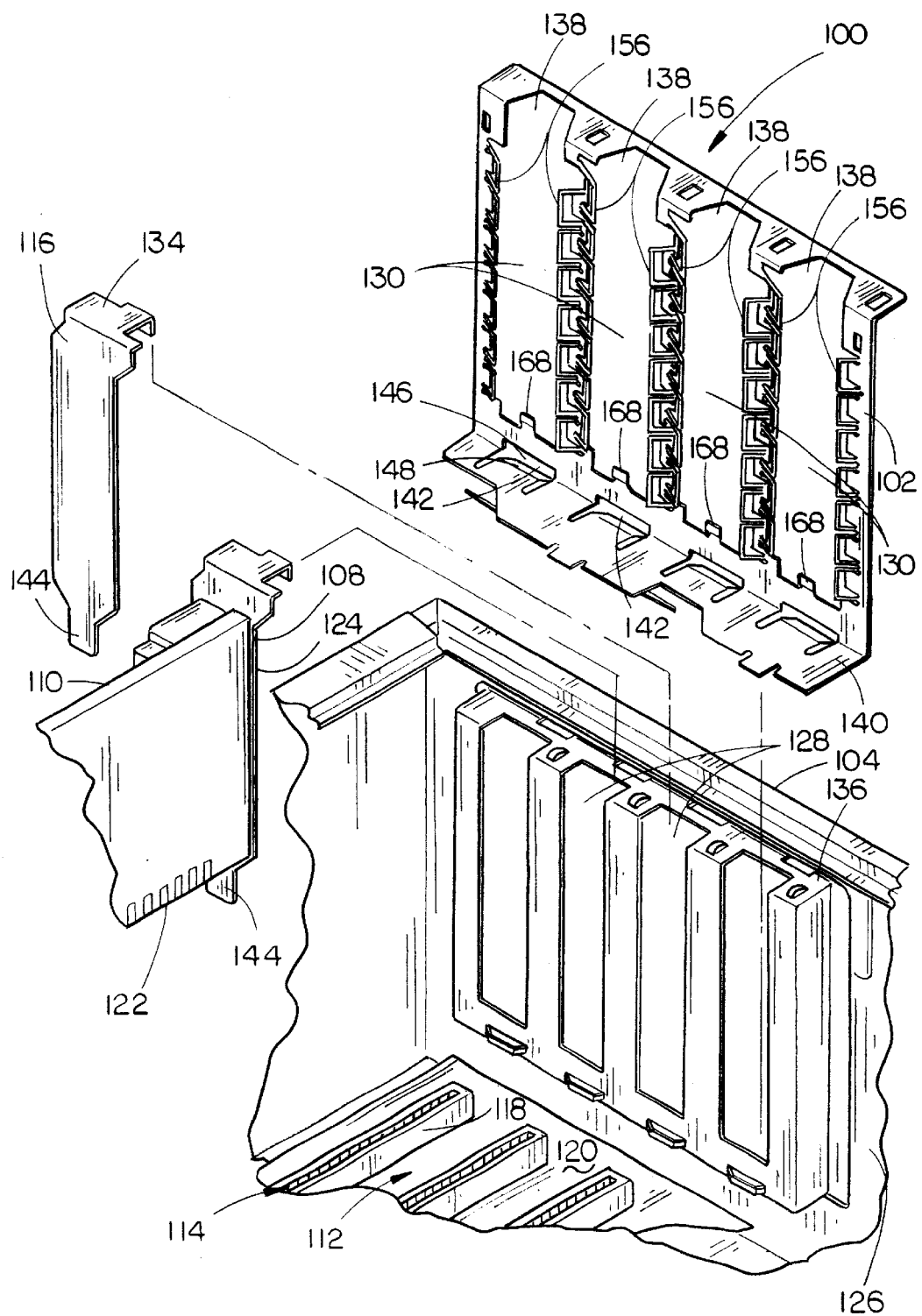
FIGS. 2 and 3 are exploded isometric views illustrating use of the EMI shield shown in FIG. 1 in the expansion bay of an electronic device.
Figure 3:
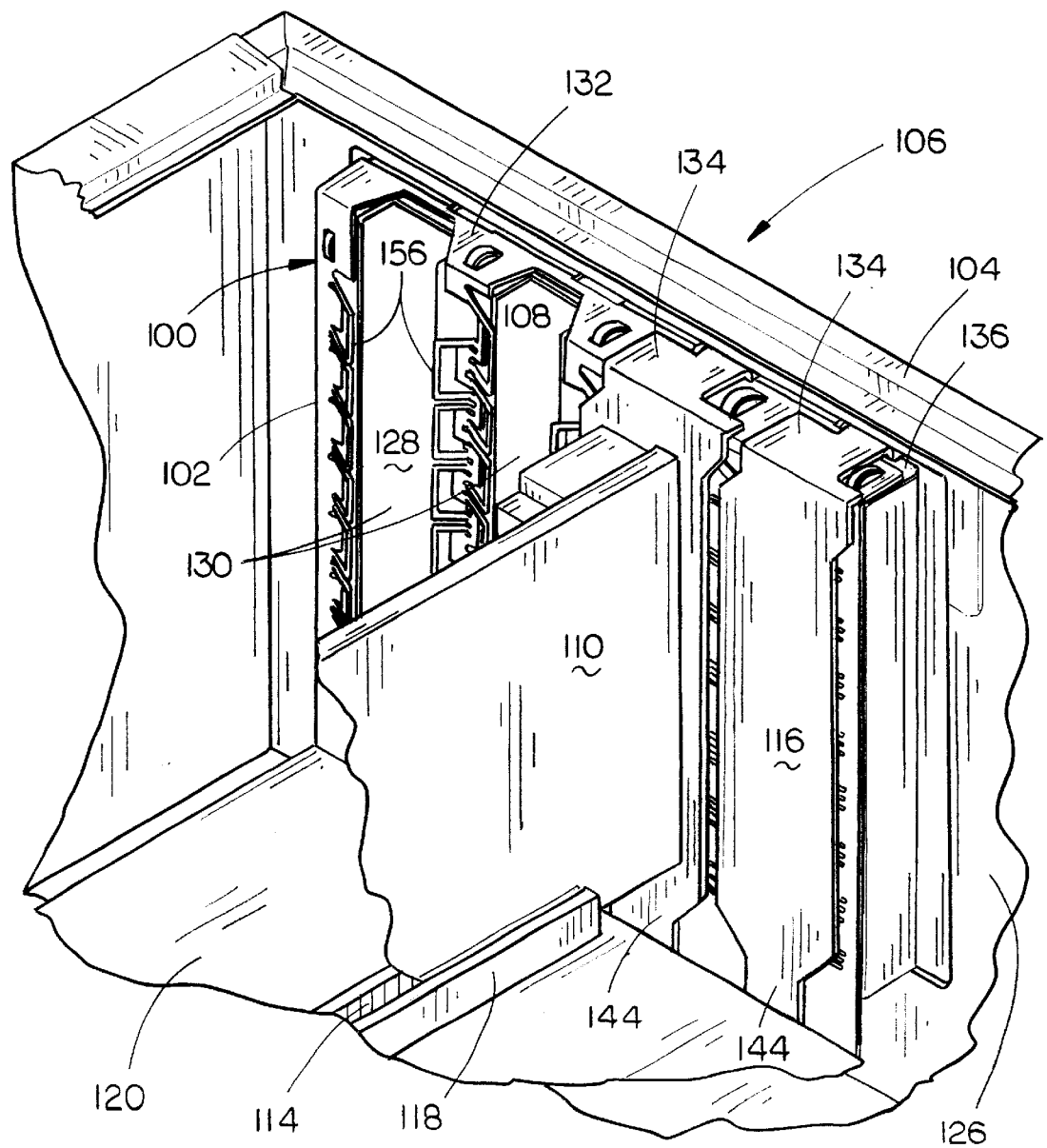

As shown in FIGS. 2 and 3, expansion slots 114 are oriented so that expansion cards 110 received therein are arranged in a spaced apart, generally parallel array wherein the end edges 124 of the cards 110 are substantially aligned with one another. Preferably, printed circuit board 120 is positioned within the chassis 104 so that expansion slots 114 are also sufficiently close to a wall of the chassis 104, such as the back panel 126 of the chassis 104, to allow the mounting bracket 108 of each card 110 received within an expansion slot 114 to be engaged by gasket 102 of EMI shield 100.

Figure 4:
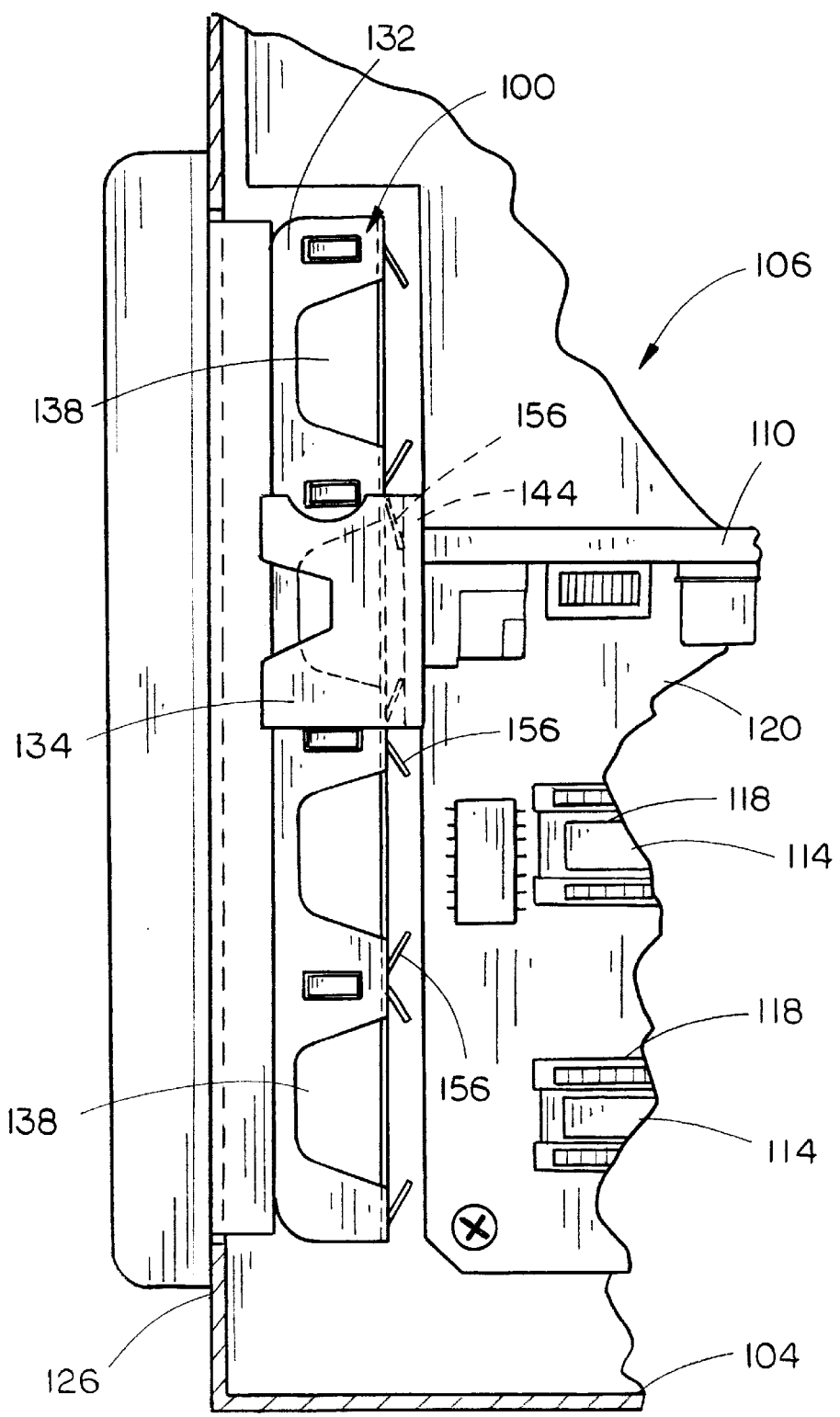
FIG. 4 is a partial cross-sectional view of the EMI shield shown in FIG. 1, further illustrating fingers formed in the shield gasket.

Expansion ports 128, comprised of elongated, generally rectangular apertures formed in back panel 126, are positioned adjacent one or more sockets 118 disposed on printed circuit board 120. As shown in FIGS. 3 and 4, when an expansion card 110 is seated within an expansion slot 114, its mounting bracket 108 registers with a corresponding expansion port 128 allowing connectors, controls or the like supported in the mounting bracket 108 to extend through the port 128 to be accessed by users of the electronic device 106. If an expansion slot 114 is empty, i.e., does not hold an expansion card 110, an expansion port cover 116 may cover the expansion port 128 to prevent environmental contaminants from entering the chassis 104, and to shield the internal electronic components of the electronic device 106 from electromagnetic interference (EMI).

Gasket 102 includes a plurality of elongated, generally rectangular apertures 130 spaced to overlay expansion ports 128. Preferably, each aperture 130 is generally equal in size to a corresponding port 128, or, alternately, is sized to be slightly larger than a corresponding port 128 so that gasket 102 does not extend into the port opening. Gasket 102 may further include a tab engaging portion 132 formed therein that is suitable for being disposed between mounting tabs 134 of the mounting brackets 108 of expansion cards 110 received in the chassis 104 (or, alternately, of expansion port covers 116) and a tab receiving surface formed in the chassis such as ledge surface 136. As shown in FIG. 1, a top portion 138 of each aperture 130 formed in gasket 102 may extend into tab engaging portion 132.

In the embodiment illustrated in FIG. 1, a flange portion 140 may be formed along the bottom end of gasket 102 for providing structural rigidity to the gasket 102. Preferably, this structural rigidity helps to reduce deformation of the gasket 102, allowing the gasket 102 to exert substantially uniform pressure against the mounting bracket 108 of each expansion card 110 received in the chassis 104. In embodiments of the invention, flange portion 140 may include a plurality of bracket receiving sections 142 formed therein for receiving and retaining ends 144 of the mounting brackets 108 of expansion cards 110 received within the chassis 104 of the electronic device 106 (or, alternately, of expansion port covers 116). Bracket-receiving portions 142 are comprised of an aperture 146 formed in flange portion 140 that is suitable for receiving the end 144 of a mounting bracket and a spring member 148 that engages the end 144 of a mounting bracket 108 for pressing and holding the bracket 108 securely against the gasket 102 when the expansion card 110 is properly seated.

Apertures 130 of gasket 102 each include opposed first and second edges 150 & 152 and bottom edges 154. A plurality of fingers 156 are formed in the gasket 102 along the first and second edges 150 & 152 of each aperture 130. As shown in FIGS. 1 through 4, each finger 156 is comprised of distal leg portions 158 & 160 joined at their inner ends to the body of the gasket 102 and at their outer ends to a cross member portion 162 so that each finger has a generally flattened C or U shape. As shown in FIG. 4, fingers 156 extend from the surface of gasket 102 at an angle for engaging the mounting bracket 108 of an expansion card 110 when the card is seated in an expansion slot 114 to provide EMI grounding between the bracket 108 and the chassis 104.

A plurality of tabs 164 are formed in gasket 102 so that each tab 164 corresponds to and is disposed underneath a corresponding generally C-shaped finger 156. Tabs 164 provide additional structural rigidity to gasket 102 to reduce flexing of the gasket 102 when expansion cards 110 are inserted within the chassis 104 of the electronic device 106. Preferably, the rows of fingers 156 and tabs 164 disposed along adjacent sides 150 & 148 of two adjacent apertures 130 are offset with each other forming a generally flattened S-shaped pattern 166 there between. This S-shaped pattern 166 allows the amount of spring force placed on mounting bracket 108 of expansion cards 110 being inserted into an expansion slot 114 to be reduced while still maintaining sufficient contact between the mounting bracket 108 and EMI shield 100 for good EMI grounding.

In the exemplary embodiment shown, a bracket-engaging prong 168 extends into each aperture 130 from the bottom edge 154 for engaging the mounting bracket 108 of an expansion card 110 inserted within a corresponding expansion slot 114. The bracket engaging prong 168 helps to position the mounting bracket 108 and provides an additional grounding point between the bracket 108 and chassis 102 along the bottoms of ports 128.

In FIGS. 1 through 4, a gasket 102 having four apertures 130 suitable for use with an electronic device 106 having four expansion ports 128 is shown. However, it will be appreciated that it is possible to provide electronic devices having expansion bays including any number of expansion slots. Accordingly, it is contemplated that an EMI shield may be provided in accordance with the present invention which is comprised of a gasket having any number of apertures to correspond to the number of ports provided in the chassis of the electronic device without departing from the scope and spirit of the invention.

Preferably, the shape of gasket 102 results in flexure of the EMI shield 100 being limited, allowing two or more expansion cards 110 to be inserted within adjacent expansion slots 114 with substantially uniform pressure. Moreover, the fingers 156 reduce binding between expansion card brackets 108 and the gasket 102 as expansion cards 110 are inserted within expansion slots 120 of the electronic device 106. The fingers 156 also allow the EMI shield to provide good EMI grounding between the mounting brackets 108 (or, alternately, between expansion port covers 170 where not expansion card 110 is used) and the chassis 104 of the electronic device 106.

It is believed that the EMI shield of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An EMI shield for a port providing access to an expansion card received in the chassis of an electronic device, comprising:
    a gasket suitable for being disposed between the chassis and a bracket of the expansion card, the gasket including an aperture overlying the port; and
    a plurality of fingers formed in the gasket adjacent to the aperture for engaging the bracket to provide EMI grounding between the bracket and the chassis,
    wherein each of the fingers has a generally flattened U shape suitable for reducing binding between the gasket and the bracket.

2. The EMI shield as claimed in claim 1, wherein the fingers extend from a surface of the gasket at an angle.

3. The EMI shield as claimed in claim 1, wherein the gasket is formed of stainless steel, and the aperture and fingers are formed by stamping.

4. The EMI shield as claimed in claim 1, further comprising a plurality of tabs formed in the gasket.

5. The EMI shield as claimed in claim 1, wherein the gasket includes a tab engaging portion formed therein suitable for being disposed between a mounting tab of the bracket of the expansion card and a tab receiving surface formed in the chassis of the electronic device.

6. The EMI shield as claimed in claim 5, wherein the gasket includes a flange portion for providing structural rigidity to the gasket.

7. The EMI shield as claimed in claim 6, wherein the gasket exerts substantially uniform pressure against the bracket.

8. The EMI shield as claimed in claim 6, wherein the flange portion includes a bracket receiving portion formed therein for receiving an end of the bracket opposite the mounting tab, the bracket receiving portion including an aperture suitable for receiving the end of the bracket and a spring member for holding the bracket against the gasket.

9. The EMI shield as claimed in claim 1, wherein the aperture in the gasket is generally rectangular in shape and includes opposed first and second edges and a bottom edge, the plurality of fingers being formed in the gasket along the first and second edges.

10. The EMI shield as claimed in claim 9, wherein the gasket includes a bracket engaging prong extending into the aperture in the gasket from the bottom edge for engaging the bracket.

11. The EMI shield as claimed in claim 1, wherein each of the plurality of fingers comprises first and second distal leg portions and a cross member portion, the cross member portion joining outer ends of first and second distal leg members.

12. An EMI shield for an electronic device having a plurality of ports suitable for providing access to expansion cards received in the chassis of an electronic device, comprising:
    a gasket suitable for being disposed between the chassis and brackets of expansion cards received in the chassis, the gasket including a plurality of apertures, each aperture overlying a port; and
    a plurality of fingers formed in the gasket adjacent to each aperture for engaging the brackets to provide EMI grounding between the brackets and the chassis,
    wherein each of the fingers has a generally flattened U shape suitable for reducing binding between the gasket and the brackets.

13. The EMI shield as claimed in claim 12, wherein the fingers extend from a surface of the gasket at an angle.

14. The EMI shield as claimed in claim 12, wherein the gasket is formed of stainless steel, and the apertures and fingers are formed by stamping.

15. The EMI shield as claimed in claim 12, further comprising a plurality of tabs formed in the gasket.

16. The EMI shield as claimed in claim 12, wherein the gasket includes a tab engaging portion formed therein suitable for being disposed between mounting tabs of the brackets and a tab receiving surface formed in the chassis of the electronic device.

17. The EMI shield as claimed in claim 16, wherein the gasket includes a flange portion for providing structural rigidity to the gasket.

18. The EMI shield as claimed in claim 17, wherein the gasket exerts substantially uniform pressure against the bracket.

19. The EMI shield as claimed in claim 17, wherein the flange portion includes a plurality of bracket receiving portions formed therein for receiving ends of the brackets opposite the mounting tabs of the brackets, each bracket receiving portion including an aperture suitable for receiving the end of the bracket inserted therein and a spring member for holding the bracket against the gasket.

20. The EMI shield as claimed in claim 12, wherein each aperture in the gasket is generally rectangular in shape and includes opposed first and second edges and a bottom edge, the plurality of fingers being formed in the gasket along the first and second edges.

21. The EMI shield as claimed in claim 20, wherein the fingers disposed along adjacent sides of adjacent apertures in the gasket are offset with each other.

22. The EMI shield as claimed in claim 20, wherein the gasket includes a plurality of bracket engaging prongs, each bracket engaging prong extending into an aperture in the gasket from the bottom edge for engaging the bracket.

23. The EMI shield as claimed in claim 12, wherein each of the plurality of fingers comprises first and second distal leg portions and a cross member portion, the cross member portion joining outer ends of first and second distal leg members.

24. The EMI shield as claimed in claim 23, wherein each aperture in the gasket is generally rectangular in shape and includes opposed first and second edges and a bottom edge, the plurality of fingers being formed in the gasket along the first and second edges.

25. The EMI shield as claimed in claim 24, wherein the fingers disposed along adjacent sides of adjacent apertures in the gasket are offset with each other and form a generally flattened S-shaped pattern.

26. An electronic device, comprising:
 a chassis including a port for providing access to an expansion card received in the chassis;
 an EMI shield for the port, the EMI shield further comprising:
  a gasket suitable for being disposed between the chassis and a bracket of the expansion card, the gasket including an aperture overlying the port; and
  a plurality of fingers formed in the gasket adjacent to the aperture for engaging the bracket to provide EMI grounding between the bracket and the chassis,
  wherein each of the fingers has a generally flattened U shape suitable for reducing binding between the gasket and the bracket.

27. The electronic device as claimed in claim 26, wherein the fingers extend from a surface of the gasket at an angle.

28. The electronic device as claimed in claim 26, wherein the gasket is formed of stainless steel, and the aperture and fingers are formed by stamping.

29. The electronic device as claimed in claim 26, further comprising a plurality of tabs formed in the gasket.

30. The electronic device as claimed in claim 26, wherein the gasket includes a tab engaging portion formed therein suitable for being disposed between a mounting tab of the bracket of the expansion card and a tab receiving surface formed in the chassis of the electronic device.

31. The electronic device as claimed in claim 30, wherein the gasket includes a flange portion for providing structural rigidity to the gasket.

32. The electronic device as claimed in claim 31, wherein the gasket exerts substantially uniform pressure against the bracket.

33. The electronic device as claimed in claim 31, wherein the flange portion includes a bracket receiving portion formed therein for receiving an end of the bracket opposite the mounting tab, the bracket receiving portion including an aperture suitable for receiving the end of the bracket and a spring member for holding the bracket against the gasket.

34. The electronic device as claimed in claim 33, wherein the gasket includes a bracket engaging prong extending into the aperture in the gasket from the bottom edge for engaging the bracket.

35. The electronic device as claimed in claim 26, wherein the aperture is generally rectangular in shape and includes opposed first and second edges and a bottom edge, the plurality of fingers being disposed adjacent to the first and second edges.

36. The EMI shield as claimed in claim 26, wherein each of the plurality of fingers comprises first and second distal leg portions and a cross member portion, the cross member portion joining outer ends of first and second distal leg members.

37. An EMI shield for a port providing access to an expansion card received in the chassis of an electronic device, comprising:
 a gasket for being disposed between the chassis and a bracket of the expansion card, the gasket including an aperture for overlying the port;
 a plurality of tabs formed in the gasket; and
 a plurality of fingers formed in the gasket adjacent to the aperture for engaging the bracket to provide EMI grounding between the bracket and the chassis,
 wherein each of the fingers has a generally flattened U shape for reducing binding between the gasket and the bracket.

38. The EMI shield as claimed in claim 37, wherein the gasket comprises a surface facing the bracket, and wherein the fingers extend from the surface at an angle.

39. The EMI shield as claimed in claim 37, wherein the gasket is formed of stainless steel, and the aperture and fingers are formed by stamping.

40. The EMI shield as claimed in claim 37, wherein the gasket comprises a tab engaging portion formed therein, the tab engaging portion being disposed between a mounting tab of the bracket and a tab receiving surface formed in the chassis for engaging the mounting tab.

41. The EMI shield as claimed in claim 40, wherein the gasket comprises a flange portion for providing structural rigidity to the gasket.

42. The EMI shield as claimed in claim 41, wherein the gasket exerts substantially uniform pressure against the bracket.

43. The EMI shield as claimed in claim 41, wherein the flange portion comprises a bracket receiving portion formed therein for receiving an end of the bracket opposite the mounting tab, the bracket receiving portion including a second aperture for receiving the end of the bracket and a spring member for holding the bracket against the gasket.

44. The EMI shield as claimed in claim 37, wherein the aperture in the gasket is generally rectangular in shape and includes opposed first and second edges and a bottom edge, the plurality of fingers being formed in the gasket along the first and second edges.

45. The EMI shield as claimed in claim 44, wherein the gasket comprises a bracket engaging prong extending into the aperture in the gasket from the bottom edge for engaging the bracket.

46. The EMI shield as claimed in claim 37, wherein each of the plurality of fingers comprises first and second distal leg portions and a cross member portion, the cross member portion joining outer ends of first and second distal leg members.

47. An EMI shield for an electronic device having a plurality of ports for providing access to expansion cards received in the chassis of an electronic device, comprising:
 a gasket for being disposed between the chassis and brackets of expansion cards received in the chassis, the gasket including a plurality of apertures, each aperture for overlying a port;
 a plurality of tabs formed in the gasket; and
 a plurality of fingers formed in the gasket adjacent to each aperture for engaging the brackets to provide EMI grounding between the brackets and the chassis,
 wherein each of the fingers has a generally flattened U shape for reducing binding between the gasket and the brackets.

48. The EMI shield as claimed in claim 47, wherein the gasket comprises a surface facing the bracket, and wherein the fingers extend from the surface at an angle.

49. The EMI shield as claimed in claim 47, wherein the gasket is formed of stainless steel, and the apertures and fingers are formed by stamping.

50. The EMI shield as claimed in claim 47, wherein the gasket comprises a tab engaging portion formed therein, the tab engaging portion being disposed between a mounting tab of the bracket and a tab receiving surface formed in the chassis for engaging the mounting tab.

51. The EMI shield as claimed in claim 50, wherein the gasket comprises a flange portion for providing structural rigidity to the gasket.

52. The EMI shield as claimed in claim 51, wherein the gasket exerts substantially uniform pressure against the bracket.

53. The EMI shield as claimed in claim 51, wherein the flange portion includes a plurality of bracket receiving portions formed therein for receiving ends of the brackets opposite the mounting tabs of the brackets, each bracket receiving portion including a second aperture for receiving the end of the bracket inserted therein and a spring member for holding the bracket against the gasket.

54. The EMI shield as claimed in claim 47, wherein each aperture in the gasket is generally rectangular in shape and includes opposed first and second edges and a bottom edge, the plurality of fingers being disposed adjacent to the first and second edges.

55. The EMI shield as claimed in claim 54, wherein the gasket includes a plurality of bracket engaging prongs, each bracket engaging prong extending into an aperture in the gasket from the bottom edge for engaging the bracket.

56. The EMI shield as claimed in claim 47, wherein each of the plurality of fingers comprises first and second distal leg portions and a cross member portion, the cross member portion joining outer ends of first and second distal leg members.

57. The EMI shield as claimed in claim 56, wherein each aperture in the gasket is generally rectangular in shape and includes opposed first and second edges and a bottom edge, the plurality of fingers being formed in the gasket along the first and second edges.

58. The EMI shield as claimed in claim 57, wherein the fingers disposed along adjacent sides of adjacent apertures in the gasket are offset with each other and form a generally flattened S-shaped pattern.

59. An electronic device, comprising:
a chassis including a port for providing access to an expansion card received in the chassis;
an EMI shield for the port, the EMI shield further comprising:
a gasket for being disposed between the chassis and a bracket of the expansion card, the gasket including an aperture for overlying the port;
a plurality of tabs formed in the gasket; and
a plurality of fingers formed in the gasket adjacent to the aperture for engaging the bracket to provide EMI grounding between the bracket and the chassis,
wherein each of the fingers has a generally flattened U shape suitable for reducing binding between the gasket and the bracket.

60. The electronic device as claimed in claim 59, wherein the gasket comprises a surface facing the bracket, and wherein the fingers extend from the surface at an angle.

61. The electronic device as claimed in claim 59, wherein the gasket is formed of stainless steel, and the aperture and fingers are formed by stamping.

62. The electronic device as claimed in claim 59, wherein the gasket comprises a tab engaging portion formed therein, the tab engaging portion being disposed between a mounting tab of the bracket and a tab receiving surface formed in the chassis for engaging the mounting tab.

63. The electronic device as claimed in claim 62, wherein the gasket comprises a flange portion for providing structural rigidity to the gasket.

64. The electronic device as claimed in claim 63, wherein the gasket exerts substantially uniform pressure against the bracket.

65. The electronic device as claimed in claim 63, wherein the flange portion includes a plurality of bracket receiving portions formed therein for receiving ends of the brackets opposite the mounting tabs of the brackets, each bracket receiving portion including a second aperture for receiving the end of the bracket inserted therein and a spring member for holding the bracket against the gasket.

66. The electronic device as claimed in claim 59, wherein the aperture is generally rectangular in shape and includes opposed first and second edges and a bottom edge, the plurality of fingers being disposed adjacent to the first and second edges.

67. The electronic device as claimed in claim 66, wherein the gasket includes a bracket engaging prong extending into the aperture in the gasket from the bottom edge for engaging the bracket.

68. The EMI shield as claimed in claim 59, wherein each of the plurality of fingers comprises first and second distal leg portions and a cross member portion, the cross member portion joining outer ends of first and second distal leg members.

* * * * *